US010921988B2

(12) United States Patent
Shin et al.

(10) Patent No.: US 10,921,988 B2
(45) Date of Patent: Feb. 16, 2021

(54) SYSTEM AND METHOD FOR DISCOVERING PARALLELISM OF MEMORY DEVICES

(71) Applicant: SK HYNIX INC., Gyeonggi-Do (KR)

(72) Inventors: Seong Won Shin, San Jose, CA (US); Yi Tong, San Jose, CA (US); Seungwan Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/276,449

(22) Filed: Feb. 14, 2019

(65) Prior Publication Data
US 2019/0250831 A1 Aug. 15, 2019

Related U.S. Application Data

(60) Provisional application No. 62/631,247, filed on Feb. 15, 2018.

(51) Int. Cl.
*G06F 3/06* (2006.01)
*G06F 12/02* (2006.01)

(52) U.S. Cl.
CPC .......... *G06F 3/0611* (2013.01); *G06F 3/0653* (2013.01); *G06F 3/0659* (2013.01); *G06F 3/0679* (2013.01); *G06F 12/0246* (2013.01); *G06F 2212/1024* (2013.01); *G06F 2212/7201* (2013.01)

(58) Field of Classification Search
CPC .... G06F 3/0611; G06F 3/0679; G06F 3/0653; G06F 3/0659; G06F 12/0246; G06F 13/38; G06F 2212/7201; G06F 2212/1024
See application file for complete search history.

(56) References Cited

U.S. PATENT DOCUMENTS

| 9,036,431 | B2 | 5/2015 | Kim et al. | |
|---|---|---|---|---|
| 9,778,848 | B2 | 10/2017 | Ramalingam | |
| 2007/0016722 | A1* | 1/2007 | Lee | G11C 11/5642 711/103 |
| 2016/0188534 | A1* | 6/2016 | Suri | G06F 12/0646 712/42 |
| 2018/0196620 | A1* | 7/2018 | Kim | G06F 3/0688 |

* cited by examiner

*Primary Examiner* — Hiep T Nguyen
(74) *Attorney, Agent, or Firm* — IP & T Group LLP

(57) ABSTRACT

A data processing system includes a host device and a memory system including a plurality of units. The host device includes a workload generation component and an analysis component. The workload generation component concurrently transmits, to the memory system, a plurality of commands for the plurality of memory units. The analysis component receives, from the memory system, command completion messages corresponding to the plurality of commands; measures latencies of the plurality of commands based on the receiving of the command completion messages; and analyze a parallelism scheme of the plurality of memory units based the measured latencies.

18 Claims, 11 Drawing Sheets

[0] [1] : Read command (LBA0/LBA1)

⓪ ① : Read DATA (LBA Contents)

SYSTEM AND METHOD FOR DISCOVERING PARALLELISM OF MEMORY DEVICES

CROSS-REFERENCE TO RELATED APPLICATION(S)

This application claims the benefit of U.S. Provisional Application No. 62/631,247, filed on Feb. 15, 2018, the entire contents of which are incorporated herein by reference.

BACKGROUND

1. Field

Embodiments of the present disclosure relate to a data processing system including a host device and an operating method thereof.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, a data storage device. The data storage device is used as a main memory device or an auxiliary memory device of the portable electronic devices.

Memory systems using memory devices provide excellent stability, durability, high information access speed, and low power consumption, since they have no moving parts. Examples of data storage devices having such advantages include universal serial bus (USB) memory devices, memory cards having various interfaces, and solid state drives (SSDs). In order to increase the performance of a memory system, memory devices included in the memory system may have a configuration in which parallel processing may be performed.

SUMMARY

Various embodiments are directed to a system and a method for discovering parallelism with respect to a plurality of memory units in a memory system.

Various embodiments are directed to a host device for discovering a parallelism scheme of a memory system having a plurality of memory units, and method thereof.

In accordance with an embodiment, a data processing system includes a host device and a memory system including a plurality of units. The host device includes a workload generation component and an analysis component. The workload generation component concurrently transmits, to the memory system, a plurality of commands for the plurality of memory units. The analysis component receives, from the memory system, command completion messages corresponding to the plurality of commands; measures latencies of the plurality of commands based on the receiving of the command completion messages; and analyze a parallelism scheme of the plurality of memory units based the measured latencies.

In accordance with an embodiment, a method for operating a host device coupled to a memory system including a plurality of memory units. The method includes concurrently transmitting, to the memory system, a plurality of commands for the plurality of memory units; receiving, from the memory system, command completion messages corresponding to the plurality of commands; measuring latencies of the plurality of commands based on the receiving of the command completion messages; and analyzing a parallelism scheme of the plurality of memory units based the measured latencies.

DETAILED DESCRIPTION

Figure 1A:
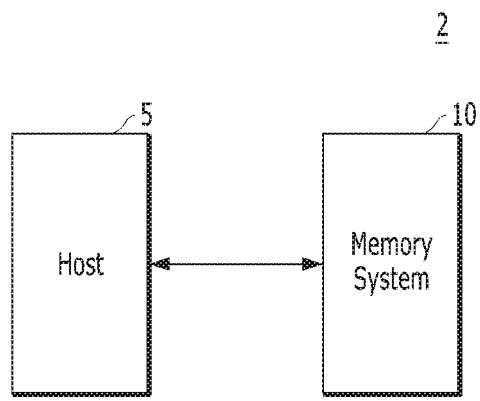
FIG. 1A is a block diagram illustrating a data processing system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like does not necessarily mean only one embodiment, and different references to any such phrases is not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example; the invention may be practiced according to the claims without some or all of these specific details. For clarity, technical material that is known in the technical fields related to the invention has not been described in detail so that the invention is not unnecessarily obscured.

FIG. 1A is a block diagram illustrating a data processing system 2 in accordance with an embodiment of the present invention.

Referring FIG. 1A, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 1B:
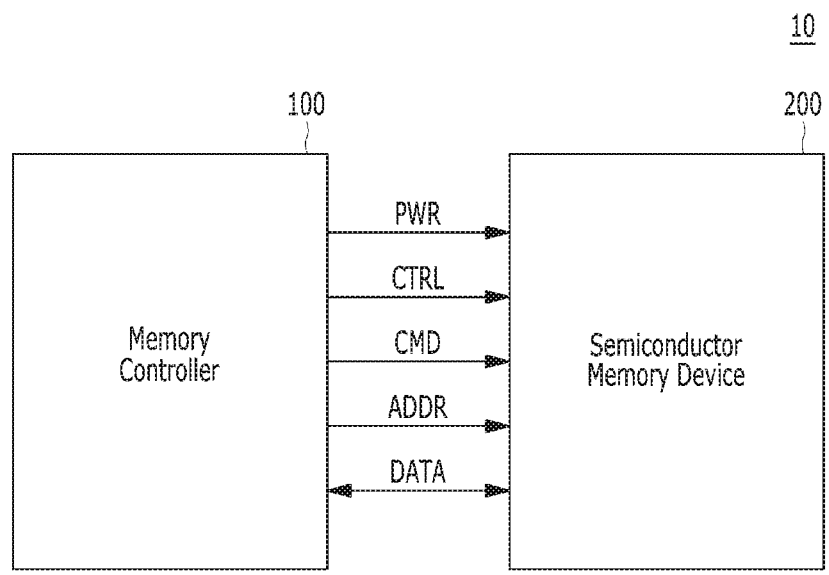
FIG. 1B is a block diagram illustrating a memory system in accordance with an embodiment of the present invention.

FIG. 1B is a block diagram illustrating a memory system 10 in accordance with an embodiment of the present invention.

Referring FIG. 1B, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1A) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
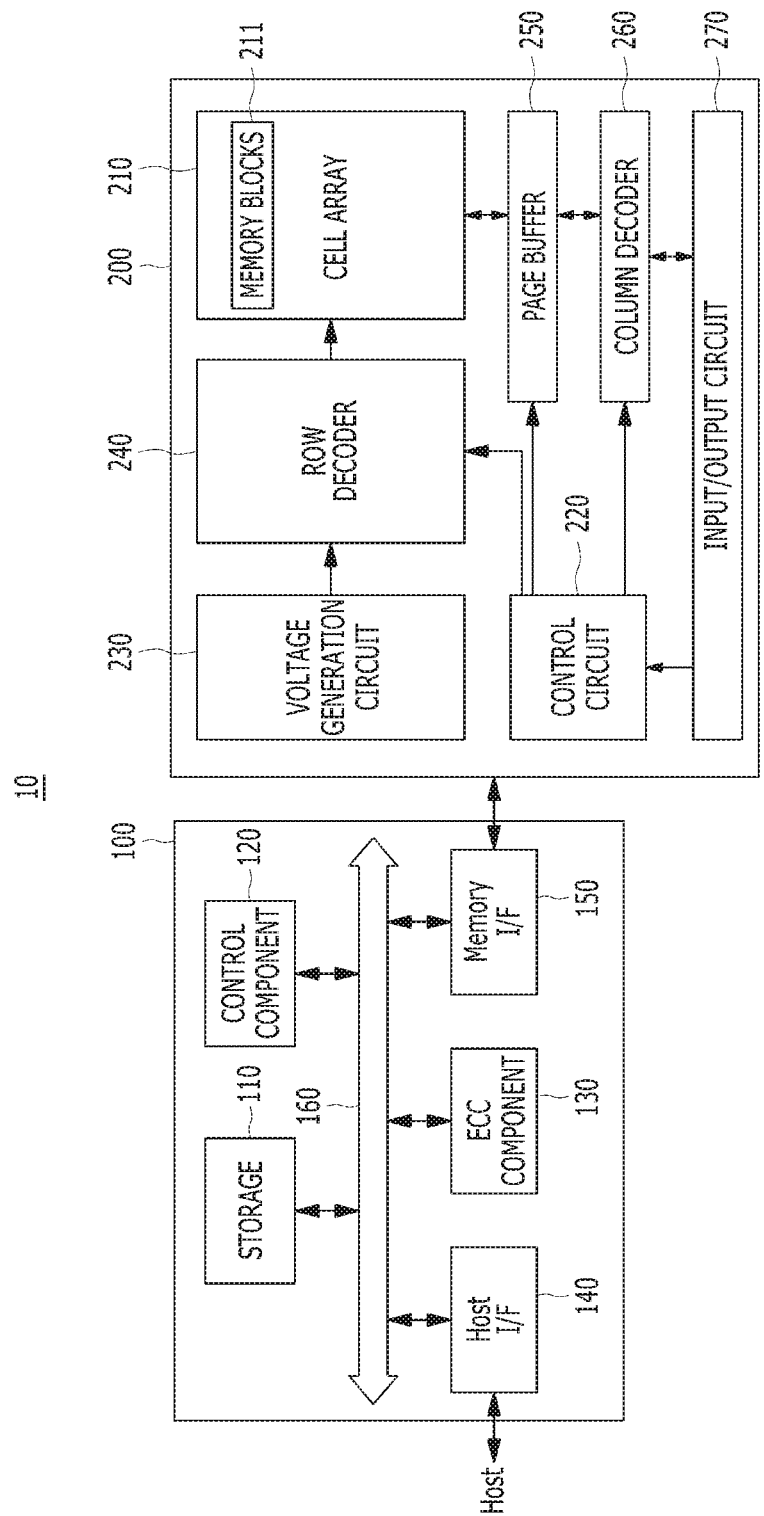
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIGS. 1A and 1B.

Referring to FIG. 2, the memory system 10 may include a memory controller 100 and a semiconductor memory device 200. The memory system 10 may operate in response to a request from a host device (e.g., host device 5 of FIGS. 1A and 1B), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
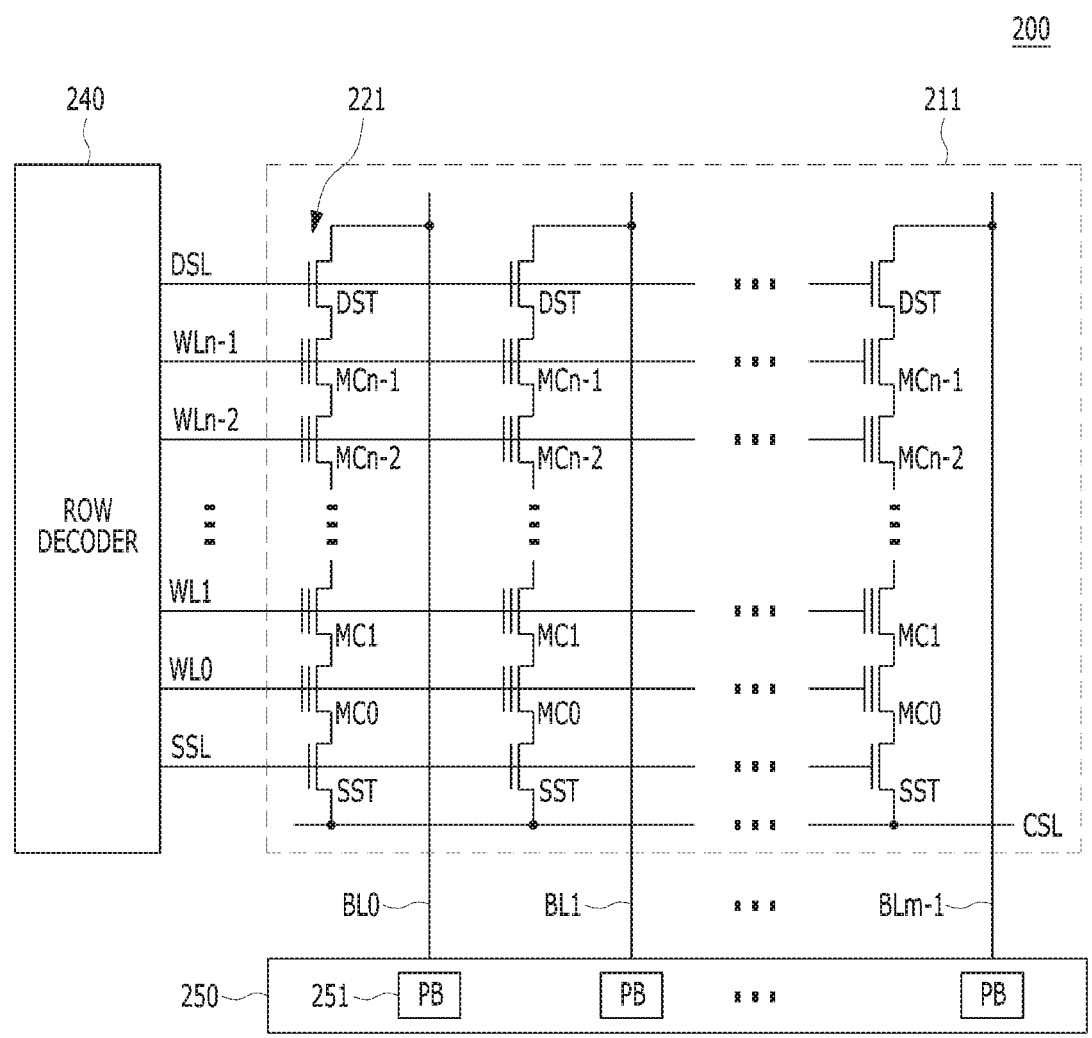
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1B), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

In various embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

The page buffer array 250 may include a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

Figure 4:
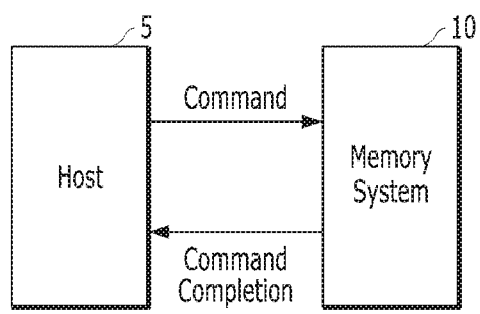
FIG. 4 is a diagram illustrating an operation for processing a command in a data processing system in accordance with an embodiment of the present invention.

FIG. 4 is a diagram illustrating an operation for processing a command in a data processing system 2 in accordance with an embodiment of the present invention.

Referring to FIG. 4, the data processing system 2 may include a host device 5 and a memory system 10. The host device 5 may issue a command for any one operation such as a write operation, a read operation and an erase operation for a plurality of units included in the memory system 10. The memory system 10 may receive a command from the host device 5 and process the received command to perform a corresponding operation for the memory units. After performing the corresponding operation, the memory system 10 may transmit a command completion message to the host device 5. Thus, the host device 5 may receive the command completion message from the memory system 10. For example, when the host device 5 may issue a read command for a read operation for a plurality of memory units included in the memory system 10, the memory system 10 may transmit, to the host device 5, a command completion message with read data corresponding to the read command. As described above, the host device 5 may issue a command for accessing the memory system 10 and acknowledge the completion of access in the memory system 10 through the command completion message. The command has a latency, e.g., a turnaround time, from command initiation by the host device 5 to command completion acknowledged by the host device 5.

The memory system 10 may be implemented with solid state drives (SSDs), and include a plurality of memory devices such as NAND flash devices. Generally, the flash devices are a slow device relative to the other components (e.g., a memory controller as system-on-chip (SoC)) of the memory system 10. In order to increase the performance of the memory system 10, the flash devices may be implemented to have a parallel structure. Usual performance metrics for the enterprise SSD are throughput (e.g., MB/s), random input and output (JO) operations per second (IoPs) and latency profile as a quality of service (QoS) measure (e.g., average or multi-nines latency profile (e.g., 99%, 99.9%)). The parallelism policy for the plurality of memory devices is one biggest contributor of the overall performance of the memory system 10. However, with existing techniques, there is no way for the host device to know the parallelism policy during a test (e.g., a black box test).

Various embodiments provide a scheme of a host device for discovering parallelism policy of a plurality of memory units included in a memory system. Knowing the parallelism policy not by the engineer's debugging environment but by the black box test is important in that it enables evaluation of the performance of the memory system per its policy decoupled from any action of developers. The scheme may be extended to evaluate behavior of any third party SSD. Since this scheme may be done by a complete black box test, no prior target SSD design knowledge (or white box) or developer's involvement may be necessary.

In various embodiments, by giving some specific access patterns (e.g., logical block address (LBA) access patterns), the parallelism policy may be revealed as externally observable command completion latency behaviors. Such patterns may be generated by a test tool and small test scripts may be added on top of the test platform.

Figure 5:
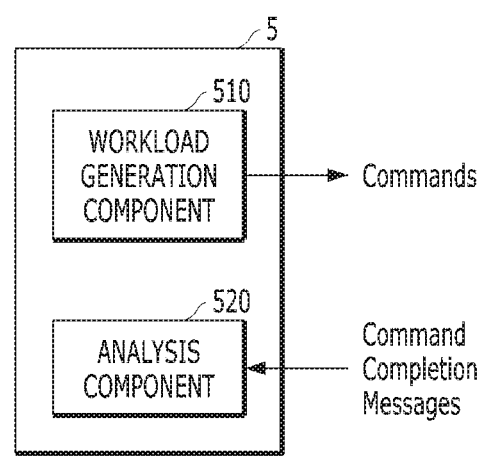
FIG. 5 is a diagram illustrating a host device in accordance with an embodiment of the present invention.

FIG. 5 is a diagram illustrating a host device (or server) in accordance with an embodiment of the present invention. The host device of FIG. 5 may correspond to the host device 5 of the data processing system 2 in FIG. 4.

Referring to FIG. 5, the host device 5 may include a workload generation component 510 and an analysis component 520. The workload generation component 510 may generate a plurality of commands as specific access patterns for a plurality of memory units. For example, the plurality of memory units may be included in the memory device 200 of the memory system 10 in FIG. 1B. The workload generation component 510 may concurrently transmit the plurality of commands to the memory system 10.

In various embodiments, the plurality of commands includes read commands for logical block addresses of the plurality of memory units. The plurality of memory units may be a plurality of memory dies.

In various embodiments, the workload generation component 510 may transmit sequential write commands to the plurality of memory units before transmitting the read commands. Further, the workload generation component 510 transmits erase commands to the plurality of memory units before transmitting the write commands.

The analysis component 520 may receive, from the memory system 10, command completion messages corresponding to the plurality of commands. The analysis component 520 may measure latencies of the plurality of commands based on the receiving of the command completion messages. The analysis component 520 may analyze a parallelism scheme of the plurality of memory units based the measured latencies. The parallelism scheme may represent structural and/or operational features, including the number of dies, their configurations and access patterns thereof.

In various embodiments, the analysis component 520 determines normalized delta latencies between two latencies among the measured latencies, and identifies the parallelism scheme of the plurality of memory units based on patterns of the normalized delta latencies.

In various embodiments, patterns of the normalized delta latencies are identical to each other for the same memory unit among the plurality of memory units, or are different for the different memory units among the plurality of memory units.

In various embodiments, the parallelism scheme includes the number of the plurality of memory units and a striping unit of each of the plurality of memory units.

Figure 6A:
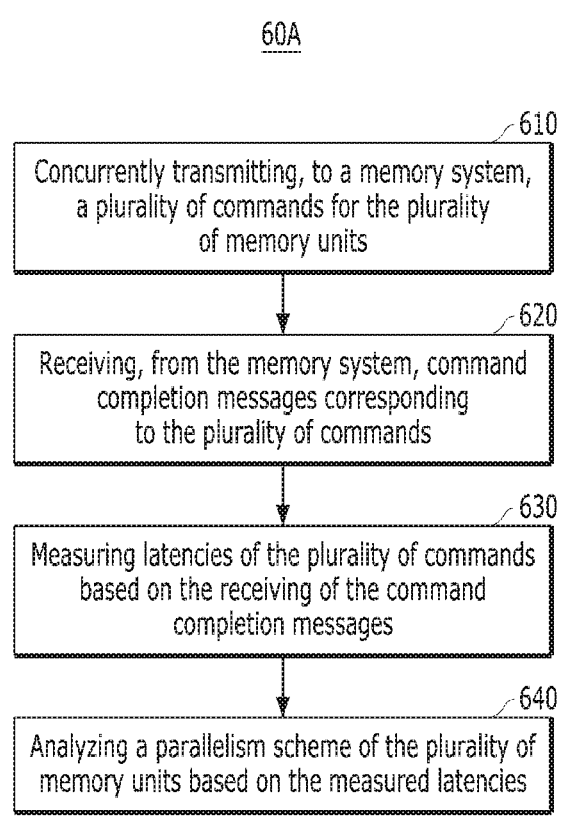
FIGS. 6A and 6B are flowcharts illustrating operations of a host device in accordance with an embodiment of the present invention.
Figure 6B:
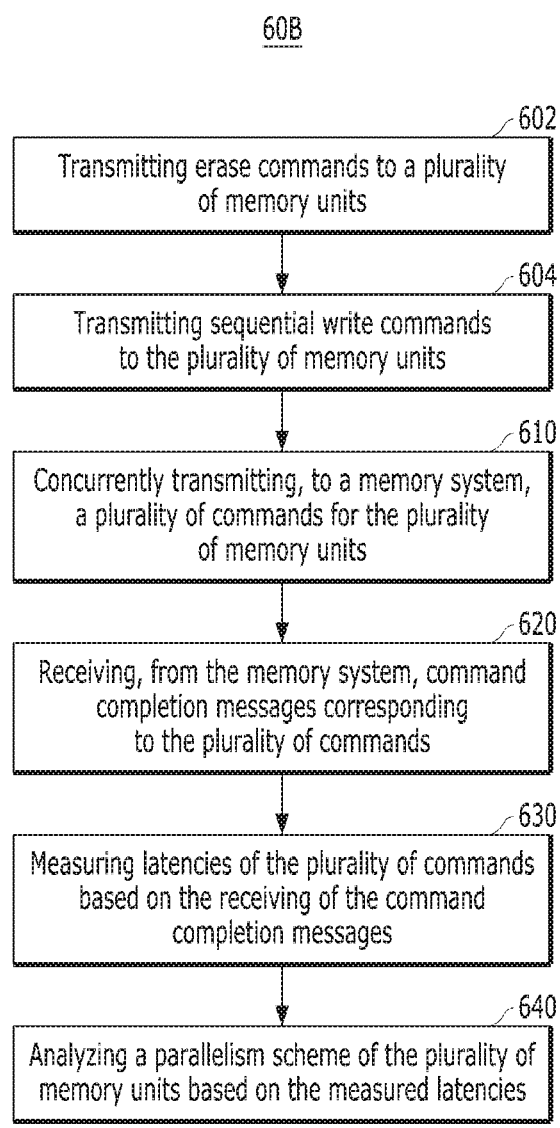

FIGS. 6A and 6B are flowcharts illustrating operations of a host device in accordance with an embodiment of the present invention. The operation of FIGS. 6A and 6B may be performed by the host device 5 of FIG. 5.

Referring to FIG. 6A, the operation 60A may include steps 610, 620, 630 and 640. At step 610, the host device 5 may generate a plurality of commands as specific access patterns for the plurality of memory units. For example, the plurality of memory units may be included in the memory device 200 of the memory system 10 in FIG. 1B. Further, at step 610, the host device 5 may concurrently transmit the plurality of commands to the memory system 10.

In various embodiments, the plurality of commands includes read commands for logical block addresses of the plurality of memory units. The plurality of memory units may be a plurality of memory dies.

At step 620, the host device 5 may receive, from the memory system 10, command completion messages corresponding to the plurality of commands. At step 630, the host device 5 may measure latencies of the plurality of commands based on the receiving of the command completion messages. At step 640, the host device 5 may analyze a parallelism scheme of the plurality of memory units based on the measured latencies.

In various embodiments, the host device 5 determines normalized delta latencies between two latencies among the measured latencies, and identifies the parallelism scheme of the plurality of memory units based on patterns of the normalized delta latencies.

In various embodiments, patterns of the normalized delta latencies are identical to each other for the same memory unit among the plurality of memory units, or are different for the different memory units among the plurality of memory units.

In various embodiments, the parallelism scheme includes the number of the plurality of memory units and a striping unit of each of the plurality of memory units.

Referring to FIG. 6B, the operation 60B may include steps 610, 620, 630 and 640 as shown in FIG. 6A. Further, the operation 60B may include steps 602 and 604, prior to step 610.

At step 602, the host device 5 may transmit erase commands to the plurality of memory units. At step 604, the host device 5 may transmit sequential write commands to the plurality of memory units.

In various embodiments, the host device 5 may perform an operation according to a test procedure shown in the following list LIST1. The test procedure includes (step a), (step b), (step c), (step d) and (step e). The (step a), (step b), (step c) and (step e) correspond to steps 602, 604, 610 and 640 of FIG. 6B, respectively. The (step d) corresponds to steps 620 and 630 of FIG. 6B. The test procedure may be performed between the host device 5 and the memory system 10 shown in FIG. 7.

| LIST1: |
|---|
| (step a) Erase whole SSD.<br>(step b)<br>Sequential Write over LBA 0 ~ (N−1),<br>where N is a capacity to test.<br>(step c) Issue Random Reads as a pair, (LBA0, 1), ... , (LBA0, (N−1))<br>(step d)<br>Measure latency of each Read (LBAi);<br>Latency(Read(LBAi)) = average(all Read(LBAi) latencies)<br>(step e)<br>Analyze normalized delta latency:<br>$Lat_{norm}(A) =$<br>((Latency(Read(LBAi)) − (Latency (Read(LBA0)))/Latency(LBA0)) |

Figure 7:
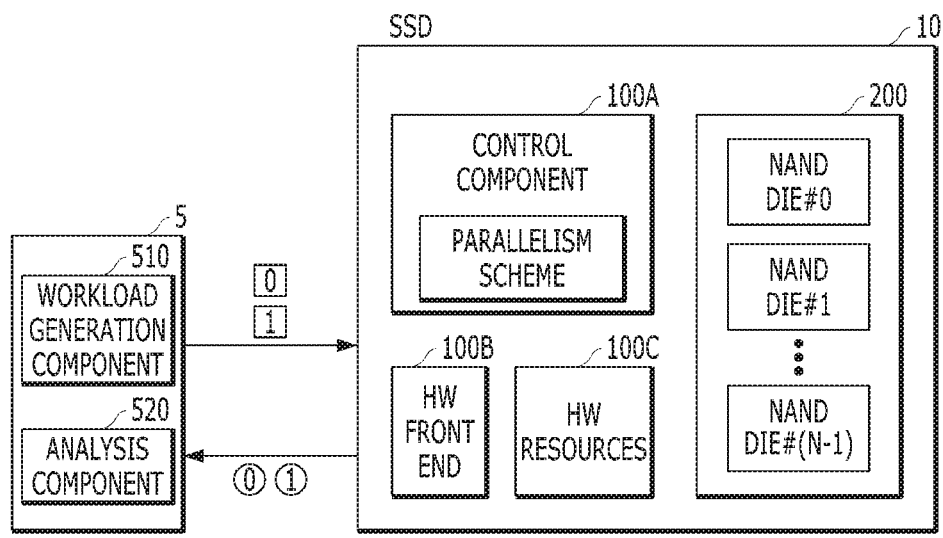
FIG. 7 is a diagram illustrating an operation for processing commands between a host device and a memory system in a data processing system in accordance with an embodiment of the present invention.

FIG. 7 is a diagram illustrating an operation for processing commands between a host device and a memory system in a data processing system in accordance with an embodiment of the present invention.

Referring to FIG. 7, the data processing system may include a host device 5 and a memory system 10. The memory system 10 may include a solid state drive (SSD) such as NAND flash based SSD. Although FIG. 7 illustrates that the memory system 10 includes a single SSD, various embodiments apply to a memory system including different SSDs with different storage media latency characteristics.

The SSD 10 may include a control component 100A, a hardware (HW) front end 100B, HW resources 100C and a memory device 200. The control component 100A may correspond to the control component 120 of FIG. 2. The HW front end 100B may correspond to the host interface 140 of FIG. 2. The HW resources 100C may include queues for receiving and queuing commands.

The memory device 200 may include a plurality of memory dies, e.g., N NAND flash dies denoted DIE#0, DIE#1, ... DIE#(N−1). Each of the plurality of memory dies may include a plurality of planes. Each of the plurality of planes may include a plurality of blocks. Each of the plurality of blocks may include a plurality of pages.

Referring to LIST1, at step (a), the host device 5 may transmit erase commands to the plurality of memory dies DIE#0 to DIE#(N−1) of the SSD 10. In other words, the host device 5 may erase the whole drive. At step (b), the host device 5 may transmit sequential write commands to all or some of the plurality of memory dies. For example, the host device 5 may sequentially write over LBA0 to LBA(N−1), where N is a capacity to test.

At step (c), the host device 5 may issue read commands for specific LBAs. For example, the host device 5 issues random read commands for a pair of LBAs, e.g., (LBA0, LBA1), (LBA0, LBA2), . . . or (LBA0, LBA(N−1)).

Upon receiving the read commands, the SSD 10 may put requests into a queue of the HW resources 100C. The control component 100A may process the requests according to the parallelism policy of the memory device 200 set by the firmware therein.

As the requests are processed, specified data (i.e., LBA contents) may be read from the memory device 200, and the read data are uploaded to the host device 5. When a specified content is retrieved from a specific die, the SSD 10 may upload the corresponding content to the host device 5 along with a command completion message for the corresponding read command.

At step (d), the host device 5 may receive command completion messages from the SSD 10, and measure latency of each read (LBAi).

Figure 8A:
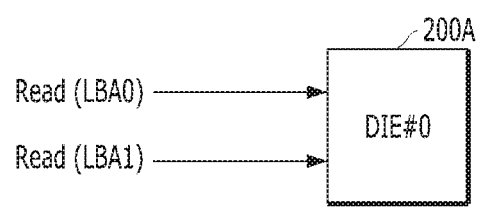
FIGS. 8A and 8B are diagrams illustrating operations for transmitting read commands by a host device in accordance with an embodiment of the present invention.
Figure 8B:
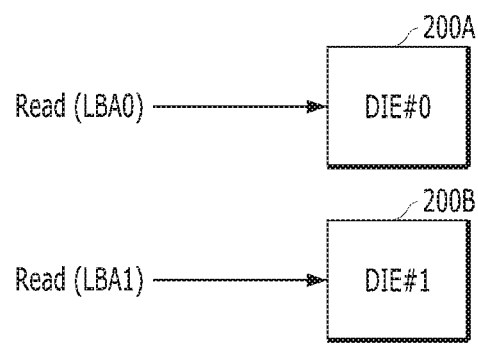

FIGS. 8A and 8B are diagrams illustrating operations for transmitting read commands by a host device in accordance with an embodiment of the present invention. For example, FIGS. 8A and 8B illustrate that the host device 5 of FIG. 7 issues two read commands for LBA0 and LBA1 concurrently.

Referring to FIG. 8A, the host device 5 may issue two read commands for LBA0 and LBA1, which correspond to single die, e.g., a die#0 200A.

Referring to FIG. 8B, the host device 5 may issue two read commands for LBA0 and LBA1, which correspond to two different dies, e.g., die#0 200A and die#1 200B, respectively.

Figure 9A:
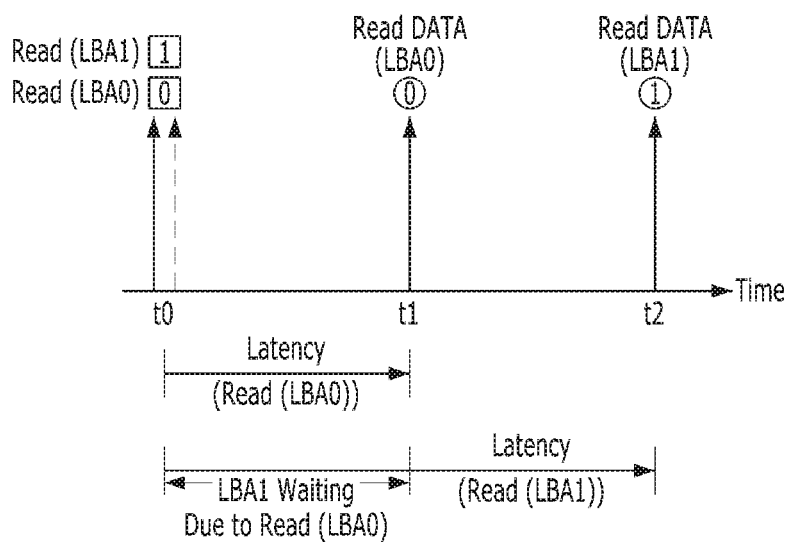
FIGS. 9A and 9B are timing diagrams illustrating operations for measuring latencies corresponding to read commands in accordance with an embodiment of the present invention.
Figure 9B:
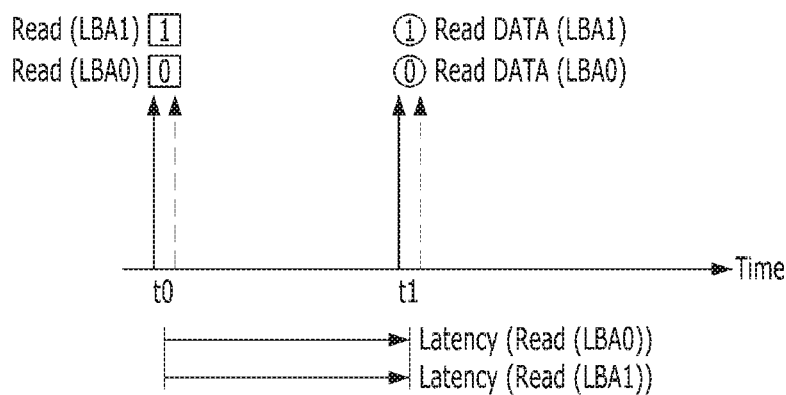

FIGS. 9A and 9B are timing diagrams illustrating operations for measuring latencies corresponding to read commands in accordance with an embodiment of the present invention. For example, FIGS. 9A and 9B illustrate that the host device 5 of FIG. 7 issues two read commands for LBA0 and LBA1 concurrently, and receives command completion messages with data corresponding to the two read commands.

Referring to FIGS. 9A and 9B, the read commands for LBA0 and 1 may be issued concurrently, but the latency for Read (LBA1) is either similar or two times of that for Read (LBA0) depending on die usage.

For example, when two LBAs correspond to the same die as shown in FIG. 8A, the SSD 10 has to wait Read (LBA1) until Read (LBA0) is completed. Therefore, as shown in FIG. 9A, the host device 5 may observe that the latency for Read (LBA1) is about two times of the latency for Read (LBA0). In other words, the latency for Read (LBA0) is the time from t0 to t1, while the latency for Read (LBA1) is the time from t0 to t2.

When two LBAs correspond to two different dies as shown in FIG. 8A, the SSD 10 may complete Read (LBA0) and Read (LBA1) concurrently. Therefore, as shown in FIG. 9B, the host device 5 may observe that the latency for Read (LBA1) is the same as that for Read (LBA0). In other words, each of the latency for Read (LBA0) and the latency for Read (LBA1) is the time from t0 to t1.

As described above, the latencies for two read commands are measured, and the measured results indicate whether the latencies are the same or different based on the configuration of dies.

Referring back to LIST1, at step (e), the host device 5 may analyze a difference between two measured latencies. In other words, the host device 5 may analyze normalized delta latency $Lat_{norm}(\Delta)$ between the two measured latencies. The normalized delta latency may be determined as the following equation: $Lat_{norm}(\Delta)=((Latency(Read(LBAi))-(Latency(Read(LBA0)))/Latency(LBA0))$.

Based on the analysis results of the step (e), the host device 5 may discover repetitive patterns or multiple periods of repetitive patterns.

Figure 10:
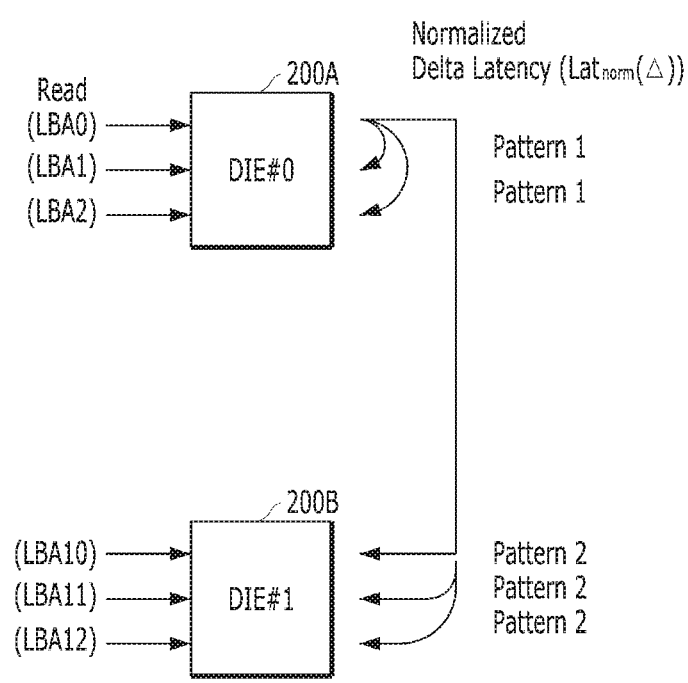
FIG. 10 is a diagram illustrating patterns of latencies corresponding to read commands by a host device in accordance with an embodiment of the present invention.

FIG. 10 is a diagram illustrating patterns of latencies corresponding to read commands by a host device in accordance with an embodiment of the present invention.

Referring to FIG. 10, read commands for LBA0, LBA1 and LBA2 are for the die#0 200A, and read commands for LBA10, LBA11 and LBA12 are for the die#1 200B. Based on the equation above, normalized delta latencies for the same die represent a certain pattern, while normalized delta latencies between the different dies represent another pattern. For example, normalized delta latencies for the same die DIE#0 200A, i.e., for the difference between Latency (Read(LBA0)) and Latency(Read(LBA1)) and the difference between Latency(Read(LBA0)) and Latency(Read (LBA2)) represent a pattern1 corresponding to FIG. 9A. Normalized delta latencies between the different dies DIE#0 200A and DIE#1 200B, i.e., for the difference between Latency(Read(LBA0)) and Latency(Read(LBA10)), the difference between Latency(Read(LBA0)) and Latency (Read (LBA11)) and the difference between Latency(Read (LBA0)) and Latency(Read(LBA 2)) represent a pattern2 corresponding to FIG. 9B.

By analyzing the results of the latencies, which LBA corresponds to which NAND die, or which data for LBA is written onto which NAND die may be determined. With that determination, the policy of a LBA writing may be dynamically changed when running a sequential write operation and during normal operations after running mixed sequential and random write operations. The change between the initial policy and any runtime policy may also be identifiable.

As shown in FIG. 10, as multiple periods of repetitive patterns are discovered, the striping unit of a die may be determined. For example, the striping unit of a die may be determined by i×(LBA size) in bytes, where i represents the number of LBAs belonging to one die and may be determined based on the number of the patterns. Further, the number of dies included in the SSD 10 may be determined. For example, the number of dies may be a deduced number from above i's by finding the number of groups. In other words, the number of dies may be determined based on the number of the patterns or the striping unit of a die.

Furthermore, for multi-level cell (MLC) or triple-level cell (TLC) NANDs, the striping unit of least significant bit (LSB) page and non-LSB page may be determined. It's the minimum i, where $Lat_{norm}(\Delta)>1$ for LBAi, i>0. $Lat_{norm}(\Delta)$ is proportional to the ratio of Latency(non-LSB page)/Latency (LSB page). Since LBA0 is an LSB page, if $Lat_{norm}(\Delta)=0$, LBAi is also LSB/MSB page. If $Lat_{norm}(\Delta)>0$, and the repeating pattern exists, LBAi is a CSB page.

Figure 11:
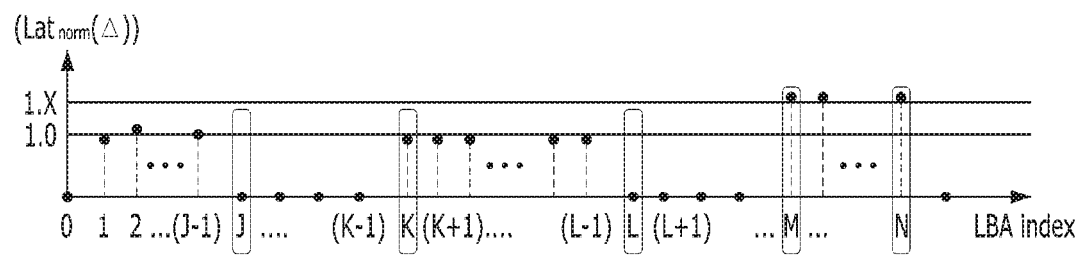
FIG. 11 is a diagram illustrating latencies corresponding to read commands by a host device in accordance with an embodiment of the present invention.

FIG. 11 is a diagram illustrating latencies corresponding to read commands by a host device in accordance with an embodiment of the present invention. FIG. 11 illustrates a typical latency scenario of concurrent read latencies for different LBAs, which depicts multiple repetitive periods and different groups.

Referring to FIG. 11, X-axis represents LBA index, and Y-axis represents normalized delta latency $Lat_{norm}$ ($\Delta$). J represents unit of $1^{st}$ die striping. J×(LBA size) is in the same die as a minimum unit. K represents unit of $2^{nd}$ die striping. K×(LBA size) is over multiple dies as a minimum unit. This unit may not be observed depending on a parallelism policy. L represents unit of $3^{rd}$ die striping. This unit may not be observed depending on a parallelism policy. M represents unit of 4th die striping=unit of LSB striping. M×(LBA size). In the example of FIG. 11, LBA0 to LBA(J−1) are in the same die as LBA0, LBA(J) to LBA(K−1) are in a die different from the die of LBA0, and LBA(K) to LBA(L−1) are in the same die as the die of LBA0. The non-zero (0) values of $Lat_{norm}(\Delta)$ contains three different cases: CSB page LBA that is in different die, LSB/MSB page that is in the same die and CSB page that is in the different die.

As described above, when a host device issues read commands for two different LBAs concurrently and corresponding data are read out, a plurality of dies included in a memory device may show different latency profiles depending on a parallelism policy or a parallel structure of the plurality of dies. Thus, by analyzing the results of the latencies, the host device which LBA corresponds to which NAND die, or which data for LBA is written onto which NAND die may be determined. In other words, the host device may analyze a parallel structure of the plurality of dies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data processing system comprising:
   a host device; and
   a memory system including a plurality of memory units, wherein the host device includes:
   a workload generation component configured to concurrently transmit, to the memory system, a plurality of commands for the plurality of memory units; and
   an analysis component configured to receive, from the memory system, command completion messages corresponding to the plurality of commands; measuring latencies of the plurality of commands based on the receiving of the command completion messages; and analyzing a parallelism scheme of the plurality of memory units based the measured latencies.

2. The data processing system of claim 1, wherein the plurality of commands includes read commands.

3. The data processing system of claim 2, wherein the workload generation component further transmits sequential write commands to the plurality of memory units before transmitting the read commands.

4. The data processing system of claim 3, wherein the workload generation component further transmits erase commands to the plurality of memory units before transmitting the write commands.

5. The data processing system of claim 1, wherein the analysis component determines normalized delta latencies between two latencies among the measured latencies, and identifies the parallelism scheme of the plurality of memory units based on patterns of the normalized delta latencies.

6. The data processing system of claim 5, wherein patterns of the normalized delta latencies are identical to each other for the same memory unit among the plurality of memory units.

7. The data processing system of claim 6, wherein patterns of the normalized delta latencies are different for the different memory units among the plurality of memory units.

8. The data processing system of claim 1, wherein the parallelism scheme includes the number of the plurality of memory units and a striping unit of each of the plurality of memory units.

9. The data processing system of claim 1, wherein the plurality of memory units includes a plurality of memory dies.

10. A method for operating a host device coupled to a memory system including a plurality of memory units, the method comprising:
    concurrently transmitting, to the memory system, a plurality of commands for the plurality of memory units;
    receiving, from the memory system, command completion messages corresponding to the plurality of commands;
    measuring latencies of the plurality of commands based on the receiving of the command completion messages; and
    analyzing a parallelism scheme of the plurality of memory units based the measured latencies.

11. The method of claim 10, wherein the plurality of commands includes read commands.

12. The method of claim 11, further comprising:
    transmitting sequential write commands to the plurality of memory units before transmitting the read commands.

13. The method of claim 12, further comprising:
    transmitting erase commands to the plurality of memory units before transmitting the write commands.

14. The method of claim 10, wherein the analyzing of the parallelism scheme of the plurality of memory units comprises:
    determining normalized delta latencies between two latencies among the measured latencies; and
    identifying the parallelism scheme of the plurality of memory units based on patterns of the normalized delta latencies.

15. The method of claim 14, wherein patterns of the normalized delta latencies are identical to each other for the same memory unit among the plurality of memory units.

16. The method of claim 15, wherein patterns of the normalized delta latencies are different for the different memory units among the plurality of memory units.

17. The method of claim 10, wherein the parallelism scheme includes the number of the plurality of memory units and a striping unit of each of the plurality of memory units.

18. The method of claim 10, wherein the plurality of memory units includes a plurality of memory dies.

* * * * *